United States Patent [19]
Kuno

[11] Patent Number: 6,057,671
[45] Date of Patent: May 2, 2000

[54] CHARGING CONTROL APPARATUS, METHOD OF CONTROLLING THE CHARGING PROCESS, AND POWER OUTPUT APPARATUS

[75] Inventor: Hiromichi Kuno, Aichi-ken, Japan

[73] Assignees: Toyota Jidosha Kabushiki Kaisha, Toyota; Matsushita Electric Industrial Co., Ltd., Kadoma, both of Japan

[21] Appl. No.: 09/267,663

[22] Filed: Mar. 15, 1999

[30] Foreign Application Priority Data

Apr. 9, 1998 [JP] Japan .................................. 10-115938

[51] Int. Cl.$^7$ .......................... H01M 10/44; H01M 10/46
[52] U.S. Cl. ............................................. 320/130; 320/150
[58] Field of Search ..................... 320/127, 128, 320/130, 150, 153

[56] References Cited

U.S. PATENT DOCUMENTS 5,652,500  7/1997  Kadouchi et al. ...................... 320/150

FOREIGN PATENT DOCUMENTS

| 0 524 466 A2 | 1/1993 | European Pat. Off. . |
| 0 731 548 A1 | 9/1996 | European Pat. Off. . |
| 8-298140 | 11/1996 | Japan . |
| 9-47094 | 2/1997 | Japan . |
| WO 95/09470 | 4/1995 | WIPO . |

OTHER PUBLICATIONS

Patent Abstracts of Japan, Publication No. 07007865 A, Jan. 1995.
Patent Abstracts of Japan, Publication No. 06245405 A, Sep. 1994.
Patent Abstracts of Japan, Publication No. 07067267 A, Mar. 1995.

*Primary Examiner*—Edward H. Tso
*Attorney, Agent, or Firm*—Oliff & Berridge, PLC

[57] ABSTRACT

To prevent excessively charging a secondary battery, which is subjected to repeated charge and discharge in a specific charged state that is lower than a full charge level, a temperature gradient of the secondary battery due to a charging process is measured, and the charged state of the secondary battery is determined to be close to the full charge level at the time point when the temperature gradient abruptly increases. The charging process is stopped based on the determination. In the case where the secondary battery is repeatedly charged and discharged, the observed temperature gradient is corrected. The correction subtracts a temperature rise due to a discharging process from the observed temperature gradient and thereby determines a temperature gradient relating to only the charging process. The correction utilizes a table that stores a relationship among the temperature rise due to the discharging process, the discharge current of the secondary battery, and the initial temperature of the secondary battery. It is also possible to determine the charged state of the secondary battery based on the temperature gradient only when the observed charge-discharge electric current shows that the secondary battery is being charged.

9 Claims, 13 Drawing Sheets

Fig. 10

|  | ELECTRIC CURRENT | | | | | |
|---|---|---|---|---|---|---|
|  | 0 | 5 | 10 | ... | 95 | 100 |
| -30 | | | | | | |
| -20 | | | | | | |
| -10 | | | | | | |
| ⋮ | | | | | | |
| 50 | | | | | | |
| 60 | | | | | | |

TEMPERATURE (a)

(b)

(c)

CHARGING CONTROL APPARATUS, METHOD OF CONTROLLING THE CHARGING PROCESS, AND POWER OUTPUT APPARATUS

BACKGROUND OF THE INVENTION

1. Field of the Invention

The present invention relates to a technique of controlling the charging process in a secondary battery and a power output apparatus that utilizes the control technique. More specifically, the present invention pertains to a technique of controlling the charging process in the secondary battery, which is subjected to repeated charge and discharge in a specific charged state that is lower than a full charge level, and thereby preventing the secondary battery from being charged excessively.

2. Description of the Related Art

Typical examples of the secondary battery include lead acid batteries, nickel-cadmium batteries, nickel-hydrogen batteries, and lithium batteries. After consumption of the electric power, these batteries are connected to an external power source and charged with a certain supply of electric current fed from the external power source. The secondary batteries have been used for a variety of apparatuses by taking advantage of these characteristics. By way of example, the secondary battery is mounted on the conventional vehicle to supply the electric power to an ignition plug of the engine. The secondary battery is also used as a main power source for driving the motor in a hybrid vehicle with the engine and the motor mounted thereon.

Each battery has a preset limit in chargeable amount of electric power. It is accordingly required to regulate the charging amount of the battery within the range of its chargeable capacity. If the charging amount of the battery exceeds this limit, that is, if the battery is excessively charged, the life of the battery may undesirably be shortened.

The technique of preventing the battery from being charged excessively is disclosed in, for example, JAPANESE PATENT LAID-OPEN GAZETTE No. 8-298140. This technique detects a temperature variation of the battery in the course of charging and determines that the charged state of the battery reaches the full charge level when the temperature variation per unit time, that is, the temperature gradient, abruptly increases. FIG. 13 is a graph showing time-based variations in electric current, voltage, and temperature of the battery in the course of charging. When a fixed amount of electric current I1 is supplied to charge the battery as shown in FIG. 13($a$), the temperature of the battery abruptly increases in the charged state close to the full charge level. This state is shown by a curve Temp1 in the graph of FIG. 13($c$). At a time point t1 in FIG. 13($c$), the charged state becomes close to the full charge level. The temperature gradient in this charged state corresponds to the slope of a tangent at each time point in the curve Temp1. For example, the temperature gradient at the time point t1 is expressed as a straight line m1 in FIG. 13($c$), and is significantly greater than the temperature gradient at another time point t2. The conventional technique takes advantage of this characteristic of the battery to detect the full charge state of the battery and stops further charging, thereby preventing the battery from being charged excessively.

In the conventional battery, once the charging process starts, the battery is continuously being charged until the charged state reaches the full charge level. This means that charging of the battery is not carried out under the circumstances where the charge and discharge are frequently repeated in a specific charged state that is lower than the full charge level. In this case, the temperature of the battery monotonically increases as shown in FIG. 13($c$). The full charge state of the battery is thus determined in response to an abrupt increase in temperature gradient.

The battery mounted on, for example, a hybrid vehicle, however, may be charged and discharged in a repeated manner during a run of the vehicle. In the hybrid vehicle, in the case where the output of the engine is greater than the required power for driving, the surplus power is used to drive the generator and charge the battery. In the case where the output of the engine is smaller than the required power, on the other hand, the electric power is discharged from the battery to drive the motor and supplement the insufficiency of the power. Such repeated charge and discharge is carried out according to the driving state of the vehicle, the charged state of the battery, and the instruction of the driver.

The battery generally evolves the Joule heat accompanied with the chemical reaction in the course of discharging. When the charge and discharge are repeatedly carried out, for example, like in the case where the battery is mounted on the hybrid vehicle, the temperature of the battery does not monotonically increases as shown in FIG. 13($c$). FIG. 14 is a graph showing time-based variations in electric current, voltage, and temperature of the battery in the case of repeated charge and discharge. For example, if discharge occurs in the course of charging the battery as shown in FIGS. 14($a$) and 14($b$), the temperature of the battery is increased by the Joule heat during the discharge and has a variation as shown in FIG. 14($c$).

When the temperature of the battery varies in this manner, the temperature gradient at a time point t2 (the slope of a tangent m2) may become identical with the temperature gradient at a time point t1 (the slope of a tangent m1) in FIG. 14($c$). At the time point t2, however, the charged state of the battery is not close to the full charge level. The control procedure that determines the full charge state of the battery based on the temperature gradient mistakenly determines that the charged state of the battery reaches the full charge level at the time point t2 and stops the charging process. This arrangement prevents the battery from being sufficiently charged and may cause the battery to untimely die or have other problems.

One available structure determines whether or not the charged state of the battery is close to the full charge level with a sensor for detecting the charged state of the battery. Another available structure integrates the electric currents fed into and discharged from the battery and thereby determines whether or not the charged state of the battery is close to the full charge level. In the former structure, however, there is a fear that the sensor for detecting the charged state of the battery malfunctions. In the latter structure, on the other hand, the error in integration may lead to wrong determination of the full charge state. It is accordingly desirable to independently determine whether or not the charged state of the battery is close to the full charge level, even if one of these methods is adopted in detection of the charged state of the battery.

SUMMARY OF THE INVENTION

One object of the present invention is thus to prevent a secondary battery, which is subjected to repeated charge and discharge in a specific charged state that is lower than a full charge level, from being charged excessively.

Another object of the present invention is to provide a hybrid-type power output apparatus with such a secondary battery mounted thereon.

At least part of the above and the other related objects is realized by a charging control apparatus that controls a charging process in a secondary battery, which is subjected to repeated charge and discharge in a specific charged state that is lower than a full charge level, in order to prevent the secondary battery from being charged excessively. The charging control apparatus includes: a temperature gradient determination unit that determines a temperature gradient, which represents a temperature rise per unit time, due to the charging process in the secondary battery as a charging-time temperature gradient; and a charging stop unit that stops the charging process in the secondary battery when the charging-time temperature gradient is greater than a specific temperature gradient, which is preset according to a charged state of the secondary battery.

The charging control apparatus of the present invention determines that the charged state of the secondary battery is close to the full charge level and stops the charging process in the secondary battery, when the observed temperature gradient of the secondary battery is greater than the specific temperature gradient. The observed temperature gradient here is the charging-time temperature gradient that relates to only the charging process. This arrangement enables the determination of the full charge state of the secondary battery to be free from the effect of a temperature gradient due to a discharging process, even in the case where the secondary battery is subjected to repeated charge and discharge in the specific charged state that is lower than the full charge level. The structure of the present invention thus enables the secondary battery in this state to be adequately charged and thereby effectively prevents the secondary battery from being charged excessively.

In the charging control apparatus of the present invention, the specific temperature gradient, which is used as the criterion to determine whether or not the charged state of the secondary battery is close to the full charge level, is experimentally set according to the type of the secondary battery and the chargeable capacity. This procedure is described previously in the prior art.

In the charging control apparatus of the present invention, there are a variety of arrangements applicable to determine the charging-time temperature gradient. In accordance with one preferable application of the charging control apparatus, the temperature gradient determination unit includes: a measurement unit that measures a temperature gradient of the secondary battery, irrespective of whether the temperature rise is ascribed to the charging process or a discharging process; a correction amount determination unit that determines a correction amount of the observed temperature gradient of the secondary battery, based on a temperature gradient due to the discharging process; and a computation unit that calculates the charging-time temperature gradient from the observed temperature gradient measured by the measurement unit and the correction amount determined by the correction amount determination unit.

This preferable arrangement enables the temperature gradient due to the charging process to be determined without using any special sensor. The correction amount may be any value that effectively prevents the charged state of the secondary battery from being determined incorrectly by the temperature gradient relating to the discharging process. For example, the correction amount may be a value corresponding to the temperature gradient due to the discharging process or a product of the value and a fixed coefficient, which is determined by taking into account a margin to the probable incorrect determination. The correction amount depends upon the discharge current. The correction amount may be fixed to a preset value, which is equal to or greater than the maximum temperature gradient that is ascribed to the discharging process.

In the charging control apparatus of the present invention, the correction amount is determined according to the discharge current. In accordance with one preferable structure, the correction amount determination unit includes: a memory unit that stores a relationship among discharge current of the secondary battery, temperature of the secondary battery, and the correction amount; a discharge current measurement unit that measures the discharge current of the secondary battery; and a temperature measurement unit that measures the temperature of the secondary battery. The correction amount determination unit refers to the relationship stored in the memory unit and reads the correction amount corresponding to the observed discharge current and the observed temperature from the relationship.

The memory unit may store the relationship among the discharge current of the secondary battery, the temperature of the secondary battery, and the correction amount in the form of a table or in the form of an arithmetic function. This preferable arrangement utilizes the relationship stored in the memory unit and thereby enables the temperature gradient due to the discharging process and the temperature gradient due to the charging process to be determined with a relatively high accuracy. This structure thus effectively prevents the secondary battery from being charged excessively, without affecting the other control procedures relating to the charging process.

In accordance with another preferable application of the charging control apparatus, the temperature gradient determination unit includes: a charge determination unit that determines whether the secondary battery is being charged; and a measurement unit that measures a temperature gradient of the secondary battery when it is determined that the secondary battery is being charged.

The charging control apparatus of this preferable arrangement determines whether or not the charged state of the secondary battery is close to the full charge level, based on the observed temperature gradient of the secondary battery, and also determines whether the secondary battery is being charged or being discharged. While the secondary battery is being discharged, there is no fear of excessively charging the secondary battery even when the observed temperature gradient is greater than the specific temperature gradient. The charging control apparatus of this structure enables the secondary battery to be charged adequately and thereby effectively prevents the secondary battery from being charged excessively.

The present invention is also directed to a hybrid-type power output apparatus having at least an engine, a motor, and a secondary battery. The power output apparatus includes: a charging-time operation control unit that controls driving conditions of the engine and the motor and drives the engine and the motor in such a manner that enables the secondary battery to be charged with at least part of an electric power generated by the motor; a temperature gradient determination unit that determines a temperature gradient, which represents a temperature rise per unit time, due to a charging process in the secondary battery as a charging-time temperature gradient; and a charging stop control unit that drives the engine and the motor under specific driving conditions without charging the secondary battery when the charging-time temperature gradient is greater than a specific temperature gradient, which is preset according to a charged state of the secondary battery.

In the hybrid-type power output apparatus having at least the engine, the motor, and the secondary battery, the motor regenerates the electric power, with which the secondary battery is charged, when the power output from the engine is greater than the required power. When the power output from the engine is less than the required power, on the contrary, the electric power is discharged from the secondary battery to drive the motor and supplement the insufficiency of the required power. The secondary battery is thus repeatedly charged and discharged in the specific charged state that is lower than the full charge level.

The power output apparatus of the present invention measures the temperature gradient of the secondary battery that is ascribed to the charging process, and determines whether or not the charged state of the secondary battery is close to the full charge level, based on the measurement. When it is determined that the charged state of the secondary battery is close to the full charge level, the power output apparatus controls the driving conditions of the engine and the motor and causes the engine and the motor to output the power under the specific driving conditions without charging the secondary battery. The power output apparatus of this arrangement thus enables the secondary battery to be charged adequately and thereby effectively prevents the secondary battery from being charged excessively, while enabling the required power to be output adequately.

Like the charging control apparatus discussed above, in accordance with one preferable application of the power output apparatus, the temperature gradient determination unit includes: a measurement unit that measures a temperature gradient of the secondary battery, irrespective of whether the temperature rise is ascribed to the charging process or a discharging process; a correction amount determination unit that determines a correction amount of the observed temperature gradient of the secondary battery, based on a temperature gradient due to the discharging process; and a computation unit that calculates the charging-time temperature gradient from the observed temperature gradient measured by the measurement unit and the correction amount determined by the correction amount determination unit.

In accordance with another preferable application of the power output apparatus, the temperature gradient determination unit includes: a charge determination unit that determines whether the secondary battery is being charged; and a measurement unit that measures a temperature gradient of the secondary battery when it is determined that the secondary battery is being charged.

The hybrid-type power output apparatus, to which the principle of the present invention is applicable, includes both the parallel-hybrid power output apparatus and the series-hybrid power output apparatus. The parallel-hybrid power output apparatus has a motor and an engine that are mechanically linked at least with a drive shaft. The power output to the drive shaft may be the power output by and transmitted from the engine or the power generated by the motor. The parallel-hybrid power output apparatus may have a generator separately from the motor. The parallel-hybrid power output apparatus is disclosed in, for example, JAPANESE PATENT LAID-OPEN GAZETTE No. 9-47094. Both the motor and the generator may carry out the power operation as the motor and the regenerative operation as the generator according to the driving state of the power output apparatus. Alternatively one of the motor and the generator may always carry out the power operation whereas the other always carries out the regenerative operation. Part of the output from the engine may be recovered as the electric power.

The series-hybrid power output apparatus has a motor that is mechanically linked with a drive shaft and a generator that is mechanically linked with an engine. This type of the power output apparatus does not have a pathway of directly transmitting the power output from the engine to the drive shaft. The power output from the engine is converted to electric power by the generator, and the motor is driven with the converted electric power to output the power.

The present invention is also directed to a method of controlling a charging process in a secondary battery, which is subjected to repeated charge and discharge in a specific charged state that is lower than a full charge level, in order to prevent the secondary battery from being charged excessively. The method includes: determining a temperature gradient, which represents a temperature rise per unit time, due to the charging process in the secondary battery as a charging-time temperature gradient; and stopping the charging process in the secondary battery when the charging-time temperature gradient is greater than a specific temperature gradient, which is preset according to a charged state of the secondary battery.

In accordance with one preferable application of the method, determining the temperature includes: measuring a temperature gradient of the secondary battery, irrespective of whether the temperature rise is ascribed to the charging process or a discharging process; determining a correction amount of the observed temperature gradient of the secondary battery, based on a temperature gradient due to the discharging process; and calculating the charging-time temperature gradient from the measured temperature gradient determined the correction amount.

In accordance with another preferable application of the method, determining the temperature includes gradient: determining whether the secondary battery is being charged or being discharged; and measuring a temperature gradient of the secondary battery when it is determined that the secondary battery is being charged.

In the same manner as the charging control apparatus discussed above, the method of the present invention can adequately control the charged state of the secondary battery.

The present invention is further directed to a computer program product in which a computer program is recorded, the computer program being used to detect an abnormality of a secondary battery, which is subjected to repeated charge and discharge in a specific charged state that is lower than a full charge level. The computer program causes a computer to realize the functions of: determining a temperature gradient, which represents a temperature rise per unit time, due to the charging process in the secondary battery as a charging-time temperature gradient; and outputting a signal that informs an operator of an abnormality of the secondary battery when the charging-time temperature gradient is greater than a specific temperature gradient, which is preset according to a charged state of the secondary battery.

The computer executes the program recorded in the computer program product to detect the abnormal charged state of the secondary battery by the function discussed previously in the charging control apparatus. One possible application stops the charging process in the secondary battery in response to the detection of the abnormal charged state. This enables the charged state of the secondary battery to be controlled adequately.

These and other objects, features, aspects, and advantages of the present invention will become more apparent from the following detailed description of the preferred embodiments with the accompanying drawings.

BRIEF DESCRIPTION OF THE DRAWINGS

FIG. 10 is a table used to give a correction amount of the temperature gradient;

DESCRIPTION OF THE PREFERRED EMBODIMENTS (1) Structure of Embodiment

Figure 1:
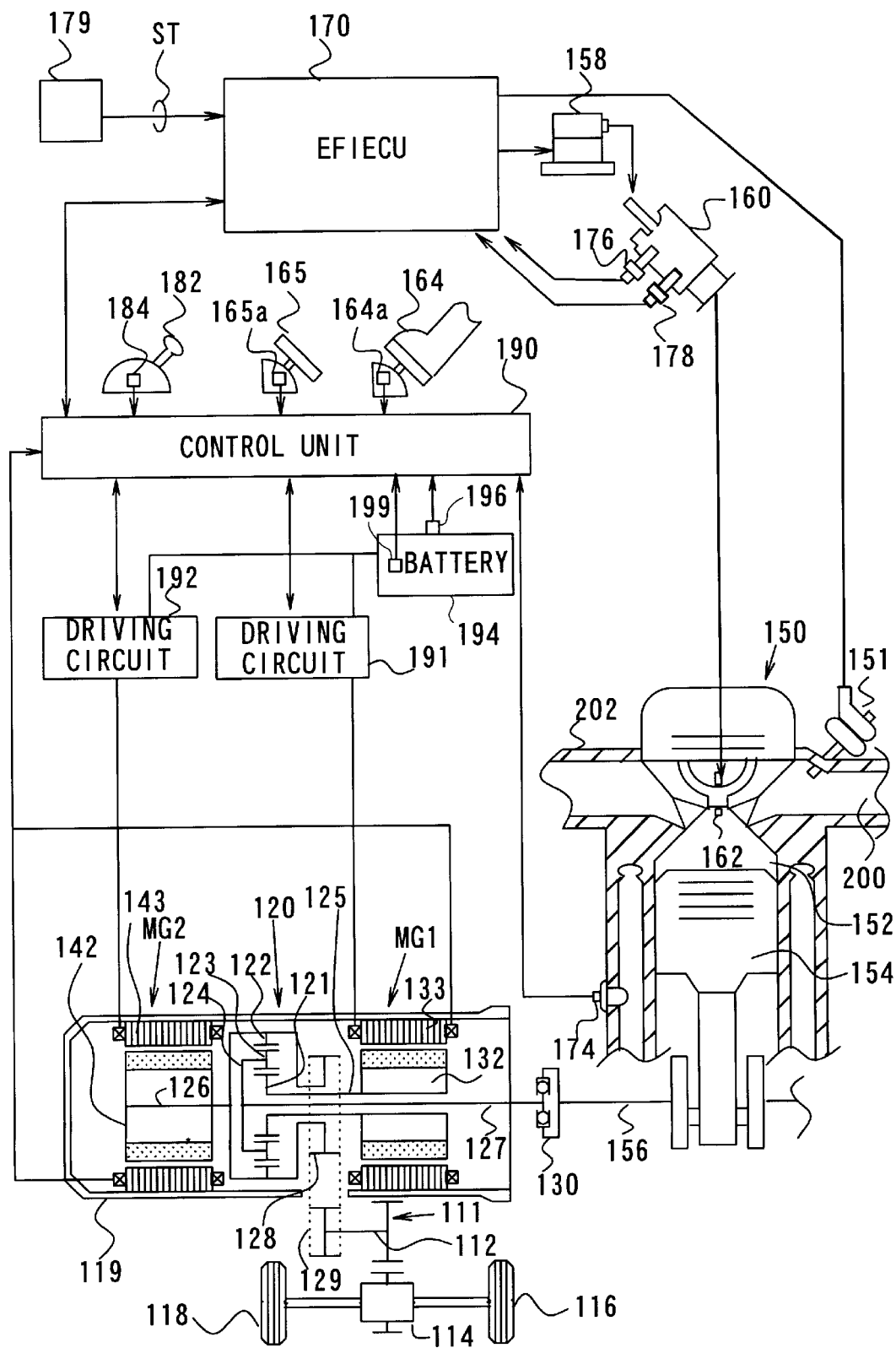
FIG. 1 schematically illustrates the structure of a hybrid vehicle with a power output apparatus of an embodiment according to the present invention mounted thereon.

The structure of one embodiment is described with the drawing of FIG. 1.

The hybrid vehicle mainly includes a power system for generating a driving force, a control system for controlling the power system, a power transmission system for transmitting the driving force from a driving source to driving wheels 116 and 118, and a driving operation unit. The power system is divided into two sub-systems, that is, a sub-system including an engine 150 and a sub-system including motors MG1 and MG2. The control system includes an electronic control unit (hereinafter referred to as EFIECU) 170 that mainly controls operations of the engine 150, a control unit 190 that mainly controls operations of the motors MG1 and MG2, and a variety of sensors that detect, input, and output signals required for the EFIECU 170 and the control unit 190.

In the engine 150, the air ingested from an air inlet 200 is mixed with a fuel, that is, gasoline in this embodiment, injected from a fuel injection valve 151. The air/fuel mixture is supplied to a combustion chamber 152 to be explosively ignited and combusted therein. Linear motions of a piston 154 pressed down by the combustion of the air/fuel mixture are converted to rotational motions of a crankshaft 156. An ignition plug 162 converts a high voltage applied from an igniter 158 via a distributor 160 to an electric spark, which explosively ignites and combusts the air/fuel mixture. The hot combustion exhaust is released to the air via an exhaust outlet 202.

The operation of the engine 150 is controlled by the EFIECU 170. The control operations of the engine 150 carried out by the EFIECU 170 include ignition timing control of the ignition plug 162 according to the revolving speed of the engine 150 and regulation of the amount of fuel injection according to the quantity of the ingested air. A variety of sensors that detect the driving conditions of the engine 150 are connected to the EFIECU 170, in order to ensure adequate control of the engine 150. These sensors include, for example, a speed sensor 176 and an angle sensor 178 attached to the distributor 160 for measuring the revolving speed and the rotational angle of the crankshaft 156. A starter switch 179 for detecting a state ST of an ignition key (not shown) is also connected to the EFIECU 170. For convenience of explanation, other sensors and switches connecting with the EFIECU 170 are omitted from the illustration.

The motors MG1 and MG2 that are also included in the power system have the structure discussed below. The motor MG1 is constructed as a synchronous motor generator and includes a rotor 132 with a plurality of permanent magnets mounted on its outer surface and a stator 133 with three-phase coils wound thereon to form a revolving magnetic field. The stator 133 is manufactured by laying thin plates of non-directional electromagnetic steel one upon another and is fixed to a casing 119. In some occasions, the motor MG1 works as a motor, in which the rotor 132 is driven and rotated by the interaction between a magnetic field created by the permanent magnets on the rotor 132 and a magnetic field created by the three-phase coils on the stator 133. In other occasions, the motor MG1 works as a generator, in which an electromotive force is generated between both ends of the three-phase coils on the stator 133 through this interaction.

Like the motor MG1, the motor MG2 is also constructed as a synchronous motor generator and includes a rotor 142 with a plurality of permanent magnets mounted on its outer surface and a stator 143 with three-phase coils wound thereon to form a revolving magnetic field. The stator 143 of the motor MG2 is also manufactured by laying thin plates of non-directional electromagnetic steel one upon another and is fixed to the casing 119. In the same manner as the motor MG1, the motor MG2 may work as a motor or a generator.

These motors MG1 and MG2 are electrically connected to a battery 194 and the control unit 190 via a first driving circuit 191 and a second driving circuit 192, each of which includes a plurality of transistors that execute switching operations. In this embodiment, a nickel-hydrogen battery is applied for the battery 194. The following describes the internal structure of the control unit 190 and the circuit structure for controlling the motors MG1 and MG2.

Figure 2:
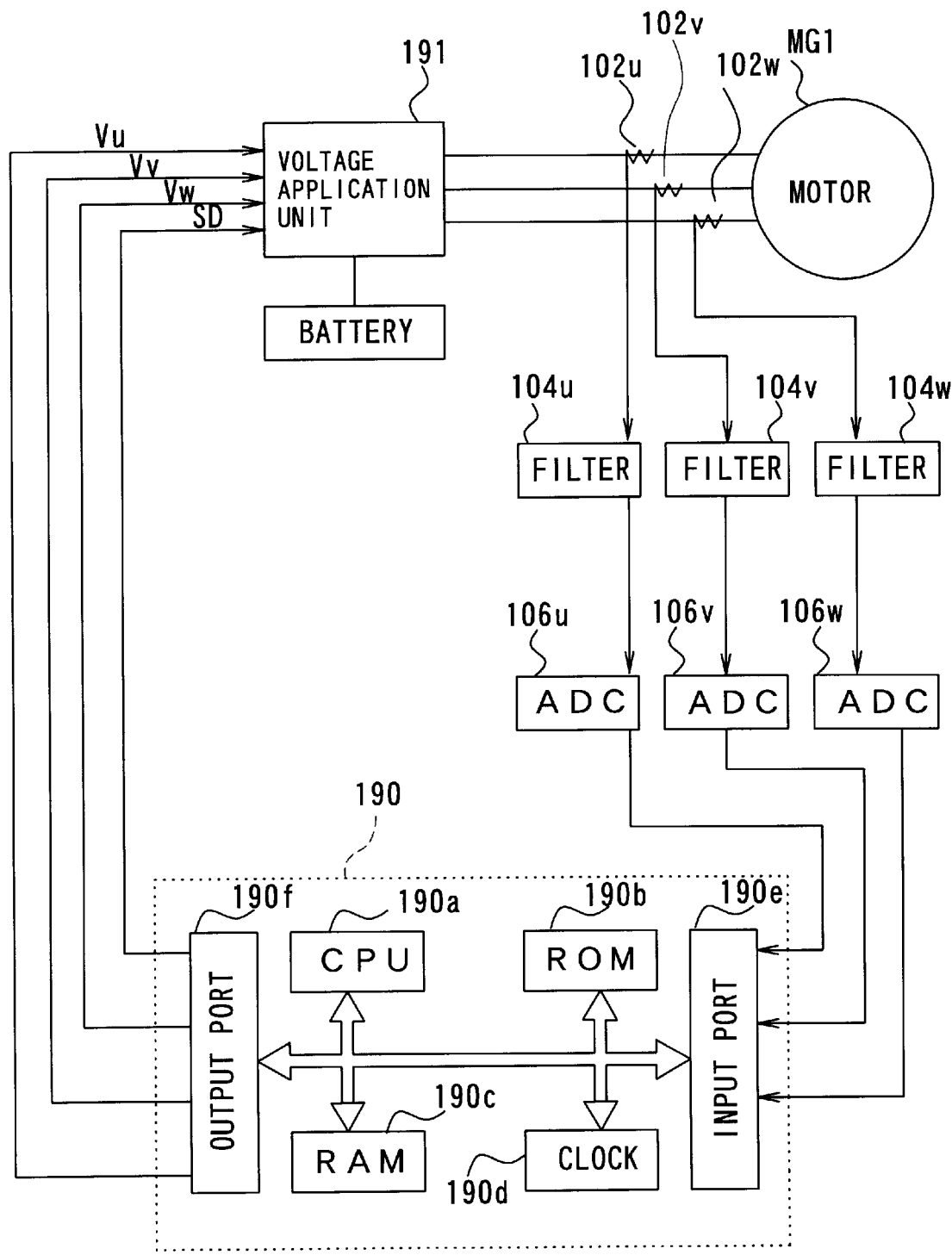
FIG. 2 schematically illustrates the control circuit of the motor MG1 in the embodiment.

FIG. 2 shows the circuit structure for controlling the motor MG1. As illustrated in FIG. 2, the control unit 190 includes a CPU 190a, a ROM 190b, in which a variety of control programs are stored, a RAM 190c used for a variety of operations in the course of the control procedure, a clock 190d that outputs synchronizing signals, an input port 190e that receives data from the outside, and an output port 190f that outputs data to the outside. The control unit 190 outputs control signals Vu, Vv, and Vw and a shut down signal SD to the first driving circuit 191 via the output port 190f. The control signals Vu, Vv, and Vw are used respectively to control the U, V, and W phases of the three-phase synchronous motor MG1. The first driving circuit 191 has six transistors as switching elements as described later. The switching operations of these elements in response to the control signals Vu, Vv, and Vw cause three-phase alternating currents fed from the battery 194 to run through the motor MG1.

The three-phase alternating currents of the U, V, and W phases are measured by current sensors 102u, 102v, and 102w, pass through filters 104u, 104, and 104w that eliminate the high-frequency components due to the switching operations, are converted into digital signals by ADCs 106u, 106v, and 106w, and are fed back to the control unit 190 via the input port 190e. The sum of the three-phase alternating currents of the U, V, and W phases is always equal to zero. one possible application may thus provide current sensors, filters, and ADCs only for the two phases, U and V phases.

Figure 3:
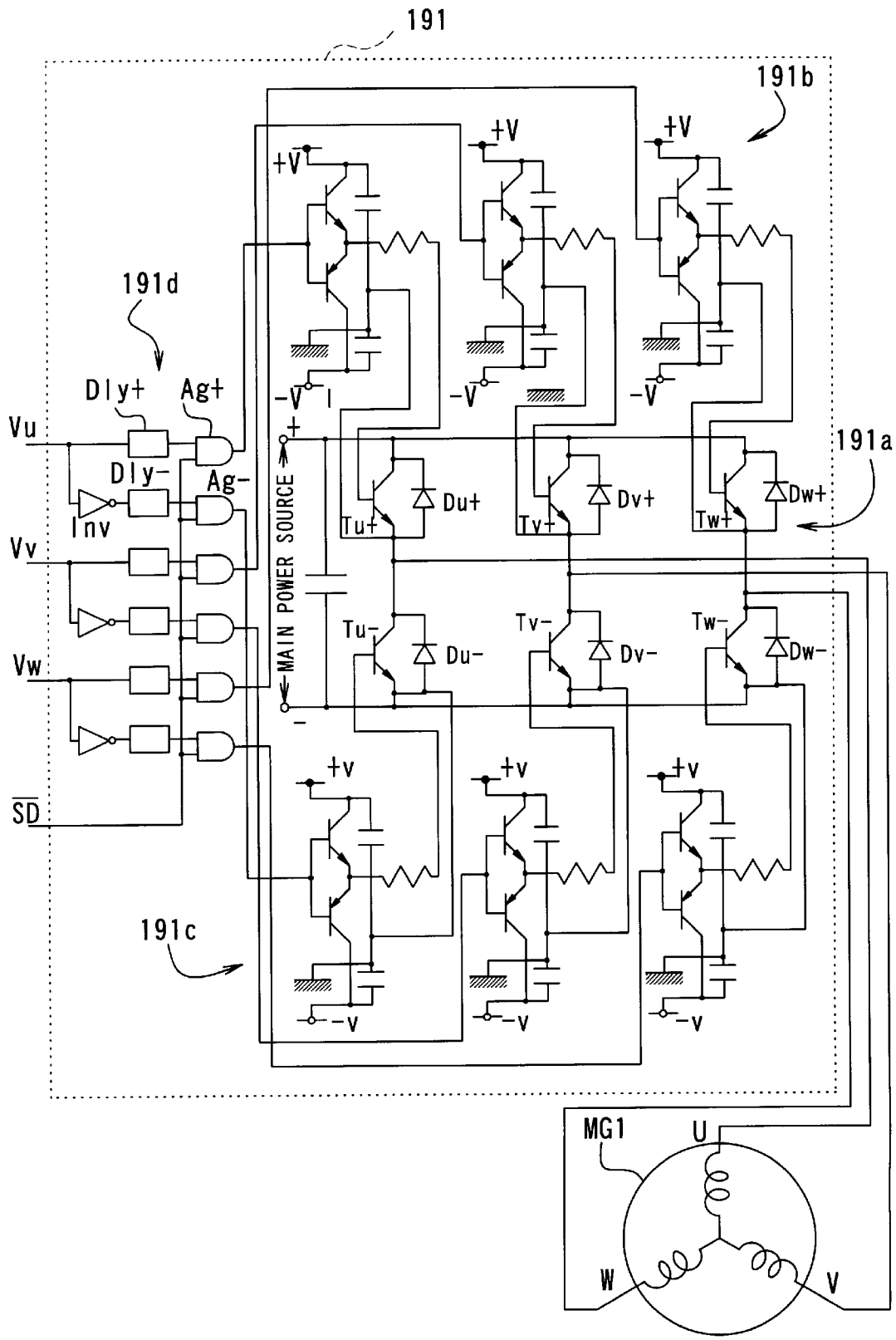
FIG. 3 is a circuit diagram showing the structure of the driving circuit 191 in the embodiment.

FIG. 3 illustrates the internal structure of the first driving circuit 191. The first driving circuit 191 mainly includes a transistor inverter 191a, a source-side pre-drive circuit 191b, a drain-side pre-drive circuit 191c, and an interface unit 191d. In the transistor inverter 191a, two transistors are arranged in pair on the source side, and the drain side of the battery 194 for each of the U, V, and W phases (see Tu+, Tu−, Tv+, Tv−, Tw+, and Tw− in FIG. 3). The respective transistors have flywheel diodes (Du+, Du−, Dv+, Dv−, Dw+, and Dw− in FIG. 3). The source-side pre-drive circuit 191b inputs gate signals to the source-side transistors (Tu+, Tv+, and Tw+) included in the transistor inverter 191a. In the source-side pre-drive circuit 191b, two transistors are provided for each of the U, V, and W phases to be connected to the source side and the drain side of a transistor inverter-driving power source (+V and −V). The drain-side pre-drive circuit 191c has a similar structure. The interface unit 191d is connected to the source-side pre-drive circuit 191b and the drain-side pre-drive circuit 191c to distribute the control signals Vu, Vv, and Vw output from the control unit 190. The embodiment separately provides a transistor inverter-driving power source (not shown in FIG. 1) that generates a lower voltage than the voltage of the battery 194. Another possible structure transforms the voltage of the battery 194 with a transformer.

The structure of the interface unit 191d is described in the example of the U phase. A signal line from the control unit 190 is connected to the source-side pre-drive circuit 191b via a delay circuit Dly+ and an AND gate Ag+. The signal line branches off before the delay circuit Dly+ and is also connected to the drain-side pre-drive circuit 191c via an inverter Inv, a delay circuit Dly−, and an AND gate Ag−. The delay circuits Dly+ and Dly− output signals without any time delay when the input voltage changes from the high level to the low level, while outputting signals with a certain time delay when the input voltage changes from the low level to the high level. This arrangement effectively prevents the transistors on the source side and the drain side from being turned on simultaneously.

The other inputs of the AND gates Ag+ and Ag− are connected to a signal line that transmits the low-active shut down signal SD, which turns off all the outputs instantaneously. The shut down signal SD is also input into the respective one inputs of AND gates of the V and W phases. When the shut down signal SD has the low level, these AND gates all have low outputs. This makes all the gate signals of the transistor inverter 191a low and causes no voltage to be applied to the motor MG1. The shut down signal is generally kept at high. The outputs of the respective AND gates are accordingly determined in response to the signals Vu, Vv, and Vw output from the control unit 190 to the driving circuit 191.

The interface unit 191d has the following functions. When the control unit 190 switches the level of the U-phase signal Vu from low to high, the high signal is output to the source-side pre-drive circuit 191b through the AND gate Ag+ thereof. The source-side transistor Tu+ in the transistor inverter 191a is then turned on in response to the output of this high signal. This signal is inverted by the inverter Inv before being transmitted to the drain-side pre-drive circuit 191c. Namely the low signal is output to the drain-side pre-drive circuit 191c through the AND gate Ag− thereof. The drain-side transistor Tu− in the transistor inverter 191a is then turned off in response to the output of this low signal. When the level of the U-phase signal Vu changes from high to low, on the other hand, the low signal is output to the source-side pre-drive circuit 191b to turn the transistor Tu+ off whereas the high signal is output to the drain-side pre-drive circuit 191c to turn the transistor Tu− on.

Controlling the switching operations of the transistor inverter 191a in this manner enables the PWM control of the ON time of the source-side transistors of the respective phases (Tu+, Tv+, and Tw+). This causes quasi three-phase alternating currents to run through the U, V, and W phases of the motor MG1. The three-phase alternating currents cause a revolving magnetic field to be formed in the stator 133 of the motor MG1 and thereby drives the motor MG1. The second driving circuit 192 has a similar circuit structure to control the second motor MG2.

Referring back to FIG. 1, a variety of sensors and switches are electrically connected to the control unit 190, in order to enable control of the driving state of the hybrid vehicle including control of the motors MG1 and MG2. The sensors and switches connected to the control unit 190 include an accelerator pedal position sensor 164a mounted on an accelerator pedal 164, a brake pedal position sensor 165a mounted on a brake pedal 165, a gearshift position sensor 184 for detecting the position of a gearshift lever 182, a water temperature sensor 174, a battery temperature sensor 196, and a remaining charge meter 199 for measuring the remaining charge of the battery 194. The control unit 190 receives a variety of signals and data, such as the observed temperature of the battery 194, from the driving operation unit through these sensors. The control unit 190 also transmits various pieces of information to and from the EFIECU 170, which controls the engine 150, through communication.

The power transmission system for transmitting the driving force from the driving source to the driving wheels 116 and 118 has the structure discussed below. The crankshaft 156 for transmitting the power of the engine 150 is linked with a planetary carrier shaft 127 via a damper 130. The planetary carrier shaft 127 and a sun gear shaft 125 and a ring gear shaft 126 for respectively transmitting rotations of the motors MG1 and MG2 are mechanically linked with a planetary gear 120, which will be described later. The damper 130 connects the crankshaft 156 of the engine 150 with the planetary carrier shaft 127, with a view to restricting the amplitude of the torsional vibrations of the crankshaft 156.

A power feed gear 128 for taking out the power is linked with a ring gear 122 and arranged between the ring gear 122 and the motor MG1. The power feed gear 128 is further connected to a power transmission gear 111 via a chain belt 129, so that the power is transmitted between the power feed gear 128 and the power transmission gear 111. The power transmission gear 111 is further connected with the left and right driving wheels 116 and 118 via a differential gear 114, so as to transmit the power to these wheels 116 and 118.

The following describes the structure of the planetary gear 120 and the linkage of the crankshaft 156, the planetary carrier shaft 127, the sun gear shaft 125 as the rotating axis of the motor MG1, and the ring gear shaft 126 as the rotating axis of the motor MG2. The planetary gear 120 includes coaxial two gears, that is, a sun gear 121 and the ring gear 122, and a plurality of planetary pinion gears 123 that are arranged between the sun gear 121 and the ring gear 122 to revolve around the sun gear 121 while rotating on its axis. The sun gear 121 is linked with the rotor 132 of the motor MG1 via the hollow sun gear shaft 125 which the planetary carrier shaft 127 passes through. The ring gear 122 is linked with the rotor 142 of the motor MG2 via the ring gear shaft 126. The planetary pinion gears 123 are connected with the planetary carrier shaft 127 via a planetary carrier 124 that supports the rotating axes of the planetary pinion gears 123. The planetary carrier shaft 127 is connected with the crankshaft 156. As is known in the field of mechanics, determination of the revolving speeds of and the torques input to and output from any two shafts among the three shafts, that is, the sun gear shaft 125, the ring gear shaft 126, and the planetary carrier shaft 127, automatically determines the revolving speed of and the torques input to and output from the residual one shaft.

The control unit 190 and the battery temperature sensor 196 included in the hardware structure discussed above constitute the charging control apparatus of the battery according to the present invention. The charging control apparatus may further include the sensors attached to the motors MG1 and MG2 for detecting the electric currents. The charging control apparatus plus the motors MG1 and MG2, the driving circuits 191 and 192, the engine 150, and the EFIECU 170 corresponds to the power output apparatus of the present invention.

(2) General Operations

The following briefly describes the general operations of the hybrid vehicle of the embodiment. The description is for the purpose of clarifying the possible occurrence of repeated charge and discharge of the battery 194 in the specific charged state that is lower than the full charge level in the hybrid vehicle of the embodiment. While the hybrid vehicle of the above structure runs in the ordinary state, the power corresponding to the required power to be output from a drive shaft 112 is output from the engine 150, is subjected to torque conversion, and is eventually transmitted to the drive shaft 112. In the case where the crankshaft 156 of the engine 150 rotates at the higher revolving speed and with the lower torque than the required revolving speed and the required torque to be output from the drive shaft 112, for example, the torque conversion causes the motor MG1 to recover part of the power output from the engine 150 as electric power and drives the motor MG2 with the recovered electric power. The planetary gear 120 divides the power output from the engine 150 into a power portion transmitted to the motor MG1 connected with the sun gear shaft 125 and a power portion transmitted to the drive shaft 112 via the ring gear shaft 126. The power distribution is carried out under the condition that the revolving speed of the ring gear shaft 126 coincides with the required revolving speed. The motor MG1 regenerates the power portion transmitted to the sun gear shaft 125 as the electric power. The motor MG2 linked with the ring gear shaft 126 is driven with the regenerated electric power, so that a torque is applied to the ring gear shaft 126. The application of the torque enables the required torque to be output to the drive shaft 112. Such regulation of the power transmitted in the form of the electric power via the motors MG1 and MG2 enables the power output from the engine 150 to be output as the desired revolving speed and the desired torque from the drive shaft 112.

In the case where the crankshaft 156 of the engine 150 rotates at the lower revolving speed and with the higher torque than the required revolving speed and the required torque to be output from the drive shaft 112, on the other hand, the torque conversion causes the motor MG2 to recover part of the power output from the engine 150 as electric power and drives the motor MG1 with the recovered electric power.

Figure 4:
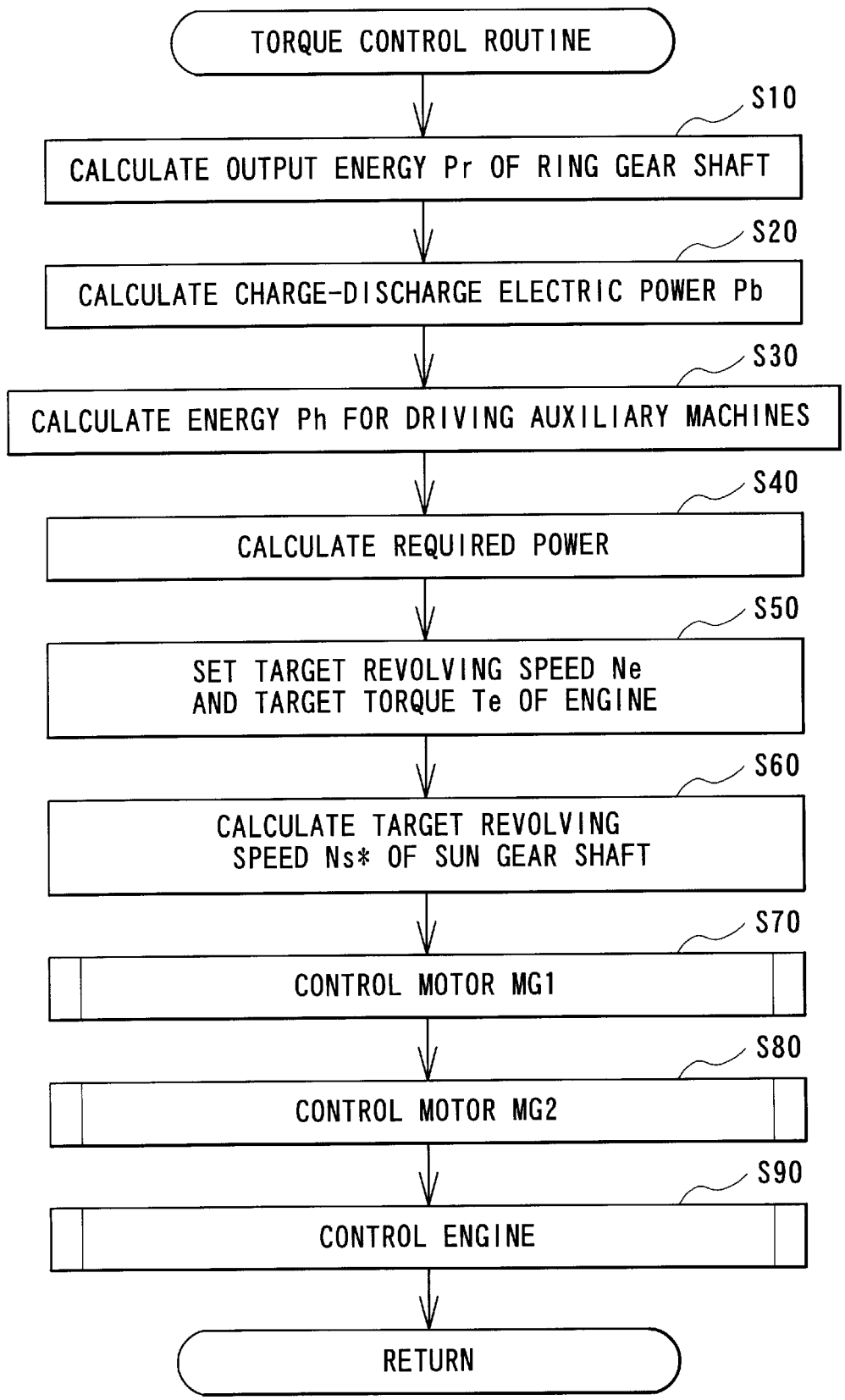
FIG. 4 is a flowchart showing a torque control routine executed in the embodiment.

The torque control procedure discussed below is carried out to attain the above functions. FIG. 4 is a flowchart showing a torque control routine executed in the hybrid vehicle of the embodiment. The torque control routine is periodically executed by the CPU 190a of the control unit 190 shown in FIG. 1.

When the program enters the torque control routine, the CPU 190a in the control unit 190 first calculates energy Pr to be output from the ring gear shaft 126 at step S10. The ring gear shaft 126 is mechanically linked with the driving wheels 116 and 118 as shown in FIG. 1, so that the energy Pr corresponds to the energy required for driving the hybrid vehicle. The energy Pr to be output from the ring gear shaft 126 is calculated from the speed of the hybrid vehicle, that is, the revolving speed Nr of the ring gear shaft 126, and the step-on amount AP of the accelerator pedal 164 measured with the accelerator pedal position sensor 164a.

The torque control is carried out by taking into account the energy balance per unit time. The term 'energy' in the following description accordingly means the energy per unit time. Namely the term 'energy' is synonymous with the term 'power' in this specification, and the term 'electrical energy' is synonymous with the term 'electric power'.

The CPU 190a then calculates charge-discharge electric power Pb at step S20. The charged state of the battery 194 is regulated to be kept within a predetermined range. The charge-discharge electric power Pb is calculated according to the charged state of the battery 194, as the energy required for charging or discharging carried out to keep the charged state of the battery 194 within the predetermined range. The CPU 190a subsequently calculates energy Ph for driving auxiliary machines at step S30. The auxiliary machines here include electrical appliances mounted on the vehicle, such as an air conditioner.

The CPU 190a then sums up the calculated energies to determine required power Pe according to the equation of Pe=Pr+Pb+Ph at step S40. The CPU 190a sets a driving point of the engine 150, that is, a target revolving speed Ne and a target torque Te, based on the required power Pe at step S50. The driving point is set according to a predetermined map, basically by giving a preference to the driving efficiency of the engine 150.

Figure 5:
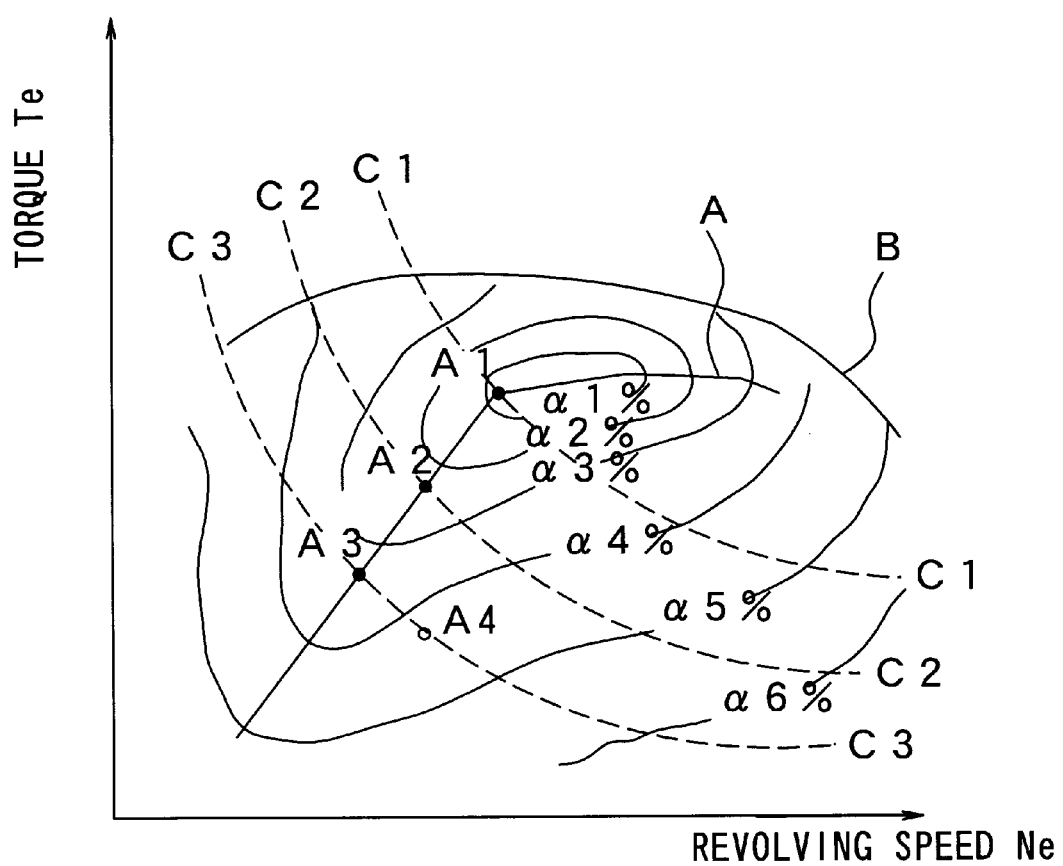
FIG. 5 is a graph showing the possible driving points of the engine 150.

FIG. 5 shows an example of the map that shows the driving state of the engine 150, with the revolving speed Ne of the engine 150 as abscissa and the torque Te of the engine 150 as ordinate. The curve B denotes the limit of the revolving speed and the torque allowable for operation of the engine 150. Each of the curves α1% through α6% is obtained by joining the driving points, on which the driving efficiency of the engine 150 is fixed. The driving efficiency decreases in the order of α1% to α6%. The curves C1—C1, C2—C2, and C3—C3 respectively denote equal-power curves, on which the power (=revolving speed×torque) output from the engine 150 is fixed.

The driving efficiency of the engine 150 significantly varies according to the revolving speed and the torque as shown in the graph of FIG. 5. When the power corresponding to the curve C1—C1 is output, for example, the engine 150 driven at the driving point (defined by the revolving speed and the torque) corresponding to the point A1 has the highest driving efficiency. In a similar manner, when the power corresponding to the curve C2—C2 or the curve C3—C3 is output, the engine 150 driven at the driving point corresponding to the point A2 or the point A3 has the highest driving efficiency, respectively. The curve A, which is generally referred to as a working curve, is obtained by selecting the driving points of the highest driving efficiency with respect to the various magnitudes of the power to be output.

A concrete procedure of setting the driving point of the engine 150 at step S50 stores a working curve, which has been experimentally obtained in advance, as a map in the ROM 190b, and reads a driving point corresponding to the required power Pe calculated at step S40 from the map to set the target revolving speed and the target torque of the engine 150. This procedure sets the driving point of the highest driving efficiency.

After setting the driving point of the engine 150, the CPU 190a calculates the target revolving speed Ns of the sun gear shaft 125 at step S60. The revolving speed Ns of the sun gear shaft 125 coincides with the revolving speed of the rotor 132 in the motor MG1. The revolving speed Nr of the ring gear shaft 126 has already been read at step S10 for the calculation of the energy Pr. The target revolving speed Ne of the engine 150 set at step S50 coincides with the revolving speed Np of the planetary carrier shaft 127. As described previously, in the planetary gear 120, determination of the revolving speeds of any two shafts automatically determines the revolving speed of the remaining one shaft. The concrete procedure of step S60 calculates the revolving speed Ns of the sun gear shaft 125 according to the following equation, which is known in the field of mechanics, based on this characteristic of the planetary gear 120:

$$Ns=Nr-(Nr-Np)\times(1+\rho)/\rho$$

where $\rho$ denotes the number of teeth of the sun gear 121 to the number of teeth of the ring gear 122.

The program then controls the operations of the motor MG1, the motor MG2, and the engine 150 with these preset values at steps S70, S80, and S90. The control procedure of the motors MG1 and MG2 is known in the art as the control of the synchronous motor and is thus not specifically described here. The control procedure of the engine 150 is also known in the art and is thus not specifically described here. Ale EFIECU 170 actually carries out the control of the engine 150 whereas the control unit 190 simply outputs required pieces of information for the control of the engine 150.

Based on the operation principle and the torque control discussed above, the hybrid vehicle may be driven with only the motor MG2 as the driving source or with both the engine 150 and the motor MG2 as the driving source. When the engine power is not required, for example, in the course of speed reduction or during a run on a downslope, and in the course of initial acceleration, the hybrid vehicle stops operation of the engine 150 and is driven only with the motor MG2. In the ordinary driving state, on the other hand, the hybrid vehicle is driven with the engine 150 as the main driving source and with the motor MG2 as the auxiliary driving source. While the hybrid vehicle is driven with both the engine 150 and the motor MG2 as the driving source, the engine 150 can be driven at the driving point of favorable driving efficiency according to the required torque and the torque producible by the motor MG2. The hybrid vehicle thus effectively saves the resource and reduces the emission, compared with the conventional vehicle that is driven only with the engine 150 as the driving source. In the hybrid vehicle of the embodiment, the rotation of the crankshaft 156 may be transmitted to the motor MG1 via the planetary carrier shaft 127 and the sun gear shaft 125. The hybrid vehicle thus enables the motor MG1 to generate electric power, while being driven with the engine 150.

When the power output from the engine 150 is greater than the required power to be output from the drive shaft 112, the surplus power is stored in the battery 194 as electric power. When the power output from the engine 150 is less than the required power, on the contrary, the motor MG2 is driven with the electric power discharged from the battery 194 to supplement the insufficiency of the power. In this manner, the battery 194 is repeatedly charged and discharged according to the driving state of the power output apparatus.

(3) Battery Charging Control Routine

The following describes a battery charging control executed in this embodiment. The battery charging control of this embodiment is carried out with a view to preventing the battery 194 from being charged excessively. The power output apparatus of the embodiment has the remaining charge meter 199 as shown in FIG. 1 and continuously monitors the charged state of the battery 194 with the output signals from the remaining charge meter 199. As shown in FIG. 2, the electric currents running through the driving circuit 191 are measured with the current sensors 102u, 102v, and 102w. Integration of the observed electric current determines the electric power balance in the battery 194 and thereby calculates the charged state of the battery 194. The power output apparatus of the embodiment carries out a charge control, in order to enable the charged state of the battery 194 to be kept within a predetermined range that is neither too much nor too little for the operation of the power output apparatus, based on the charged state either observed or calculated in the above manner. This charge control procedure is executed according to a different routine from a battery charging control routine discussed below.

The battery charging control of this embodiment is carried out, in order to prevent the battery 194 from being excessively charged even when the charge control procedure is not adequately carried out. Inadequate control of the charged state of the battery 194 may occur, for example, when the remaining charge meter 199 malfunctions or when there is an error in integration of the electric power balance. The object of the battery charging control discussed below is thus to prevent the battery 194 from being excessively charged in such cases. The battery charging control of this embodiment is naturally applicable even to the case in which the charge control procedure is not carried out to keep the charged state of the battery 194 within the predetermined range.

Figure 6:
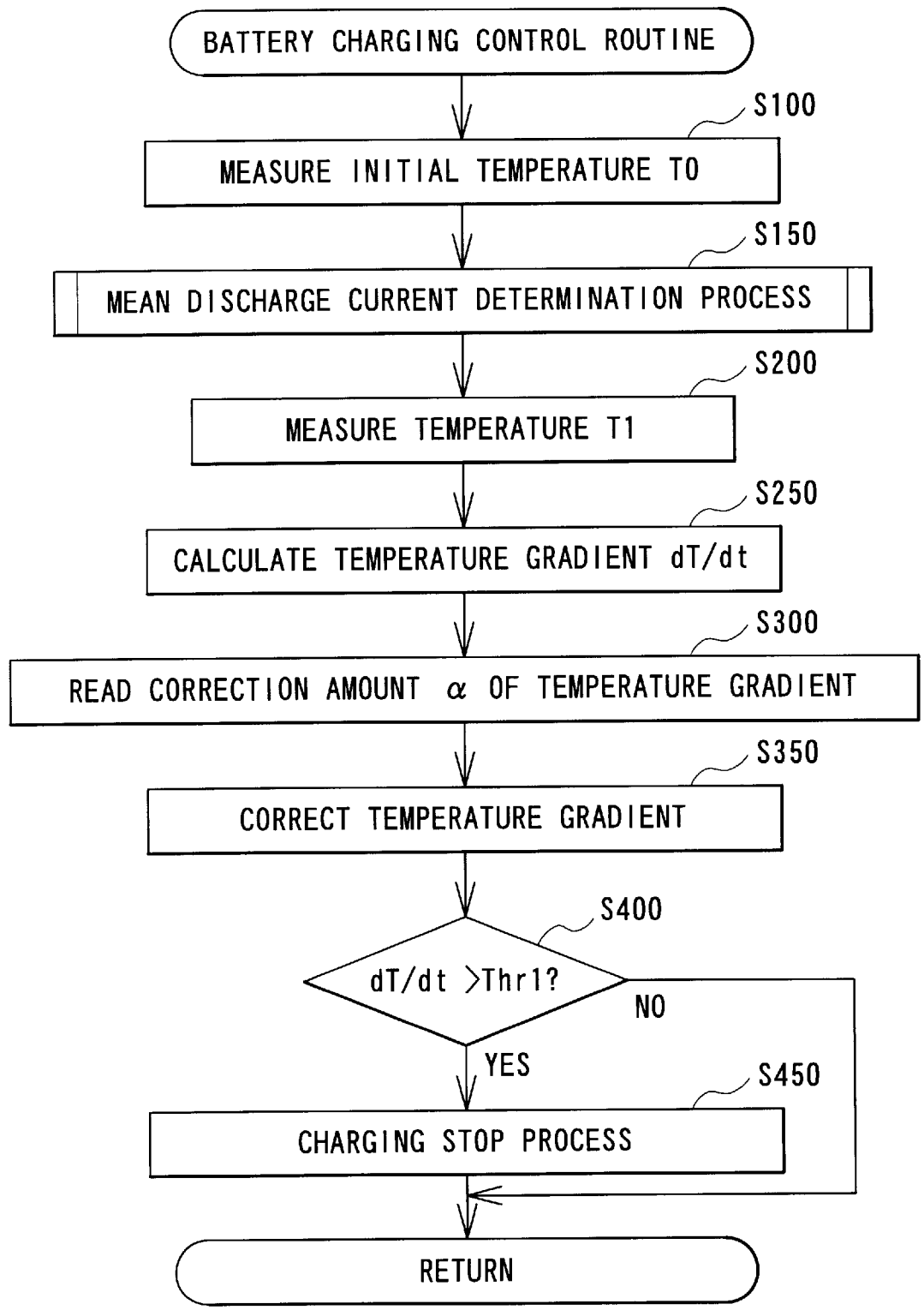
FIG. 6 is a flowchart showing a battery charging control routine carried out in the embodiment.

FIG. 6 is et flowchart showing a battery charging control routine executed in this embodiment. The battery charging control routine is repeatedly executed at predetermined time intervals through timer interruption by the CPU 190a in the control unit 190.

When the program enters the battery charging control routine, the CPU 190a first measures an initial temperature T0 of the battery 194 at step S100. The temperature of the battery 194 is measured with the battery temperature sensor 196 shown in FIG. 1.

The CPU 190a then carries out a mean discharge current determination process at step S150. The mean discharge current determination process calculates a mean value of the electric currents discharged from the battery 194 within a predetermined time period while the battery charging control is executed. The details of the mean discharge current determination process are described below with the flowchart of FIG. 7.

When the program enters the mean discharge current determination process, the CPU 190a first carries out initialization at step S152. The concrete procedure of the initialization substitutes the value '0' into a variable itot, which represents the sum of the electric currents, a variable t, which represents the elapse of time, and a variable tdc, which represents the total discharge time. The CPU 190a then determines an initial current i0 at step S154. The initial current i0 is obtained by summing up the measurements of the current sensors 102u, 102v, and 102w (see FIG. 2) provided for the motor MG1 and the corresponding current sensors provided for the motor MG2.

After elapse of a sampling time dti at step S156, the CPU 190a increments the variable t representing the elapse of time by the sampling time dti at step S158 and determines an electric current i1 at step S160. The electric current i1 is determined in the same manner as the determination of the initial current i0.

It is then determined at step S162 whether or not both the initial current i0 and the electric current i1 have positive values. The direction of the electric current from the battery 194 is positive when the battery 194 is in the discharging state. Namely the procedure of step S162 determines whether or not both the initial current i0 and the electric current i1 are discharging currents. In the case where both the initial current i0 and the electric current i1 are positive, that is, when they are discharging currents, the CPU 190a increments the sum of the electric currents itot by (i0+i1)× dti/2 at step S164 and increments the total discharge time tdc by the sampling time dti at step S166.

Figure 8:
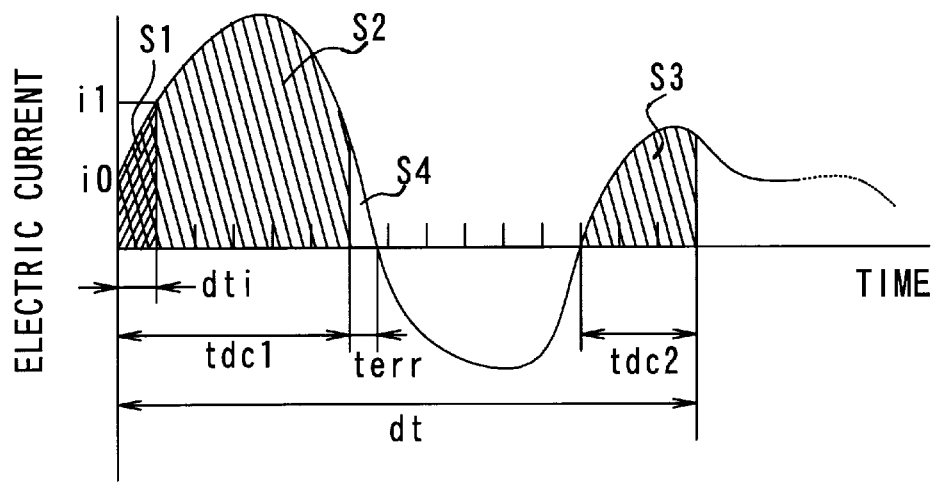
FIG. 8 shows a process of determining the mean discharge current.

This process calculates the integral of the electric current under the discharging condition of the battery 194 on time by trapezoidal integration. FIG. 8 is a graph showing a-variation in electric current, with which the battery 194 is charged and which is discharged from the battery 194. When both the initial current i0 and the electric current i1 have positive values, execution of step S164 in the first cycle calculates the area of a crosshatched portion S1 shown in FIG. 8. The calculated area of the portion S1 is approximate to the integral of the electric current on time. Although this embodiment adopts the technique of trapezoidal integration, another integration rule may be applied instead.

After the integration of the electric current in the discharging state on an interval of the sampling time dti, the CPU 190a substitutes the electric current i1 into the initial current i0 at step S168. The CPU 190a repeatedly executes the integration of discharge current at steps S156 through S166 until the elapse of time t exceeds a preset time period dt for determining a mean discharge current at step S170. This process gives values corresponding to the areas of hatched portions S1, S2, and S3 shown in FIG. 8. The time period corresponding to the sum (tdc1+tdc2) shown in FIG. 8 is given as the total discharge time tdc. The mean discharge current iav is obtained by dividing the sum of the electric currents itot by the total discharge time tdc at step S172.

Figure 7:
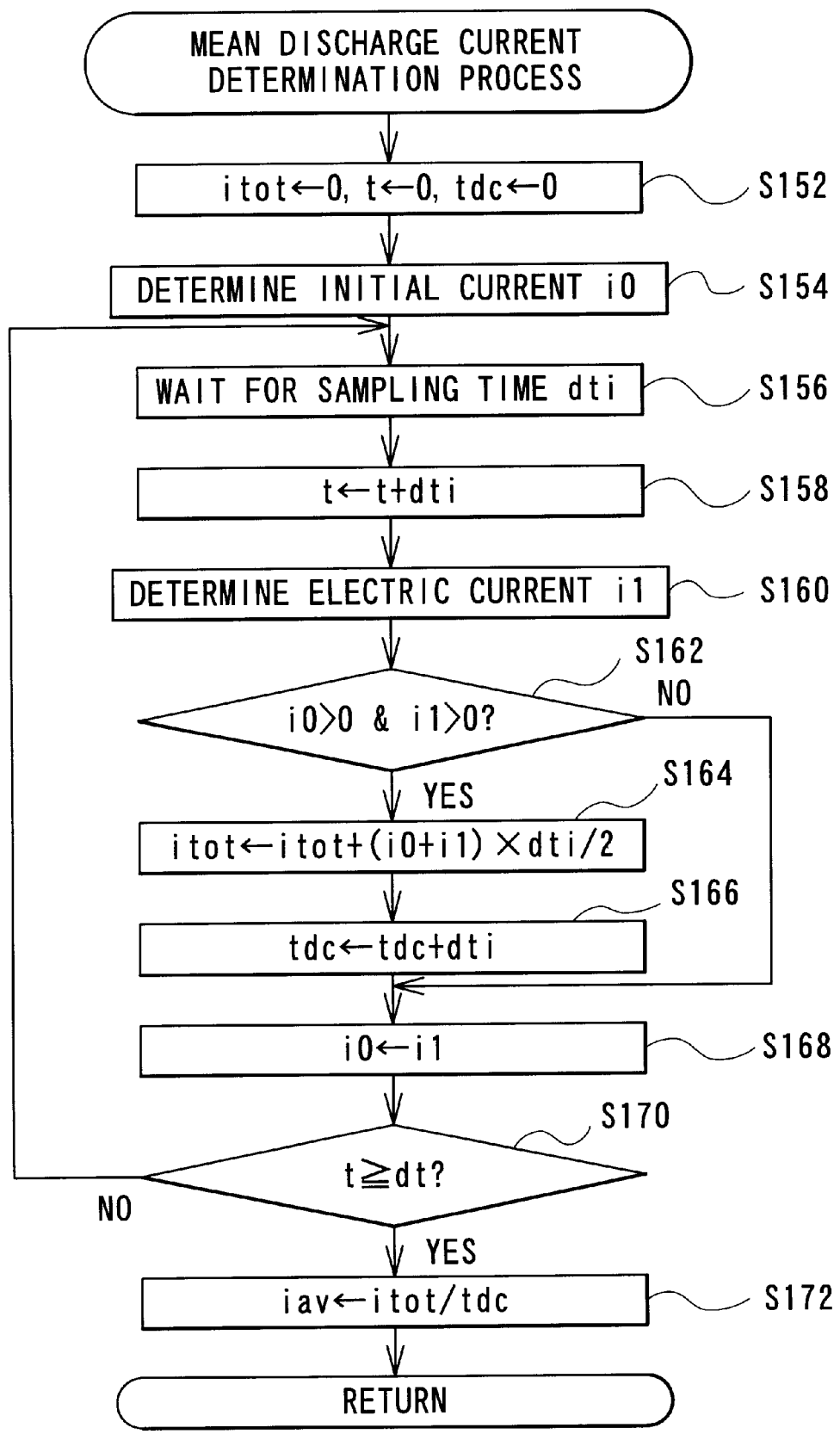
FIG. 7 is a flowchart showing the details of the mean discharge current determination process executed at step S150 in the flowchart of FIG. 6.

In the case where it is determined that both the initial current i0 and the electric current i1 are not positive at step S162 in the mean discharge current determination process of FIG. 7, integration of the electric current (that is, the processing at steps S164 and S166) is not carried out since it is assumed that the battery 194 is not in the discharging state. Strictly speaking, however, when either one of the initial current i0 and the electric current i1 has a positive value (like a portion S4 shown in the graph of FIG. 8), the battery 194 is actually in the discharging state at that moment. The procedure of this embodiment, however, neglects this type of discharging. In the case where the sampling time dti is set sufficiently short, there is only a negligibly small arithmetic error even when the discharge in such a very short time period is neglected. Such neglect thus hardly affects the performance of the control. The discharge time also has an error corresponding to a time period terr shown in FIG. 8. This error is also negligible because of a similar reason. When either one of the initial current i0 and the electric current i1 has a positive value, another available technique carries out interpolation to determine a time point at which the electric current is equal to zero, and subsequently calculates the integral of the discharge current on time.

Referring back to the flowchart of FIG. 6, when the mean discharge current determination process is concluded at step S150, the CPU 190a measures a temperature T1 of the battery 194 at step S200 and calculates a temperature gradient dT/dt according to the following equation at step S250:

$$dT/dt=(T1-T0)/dt$$

Figure 9:
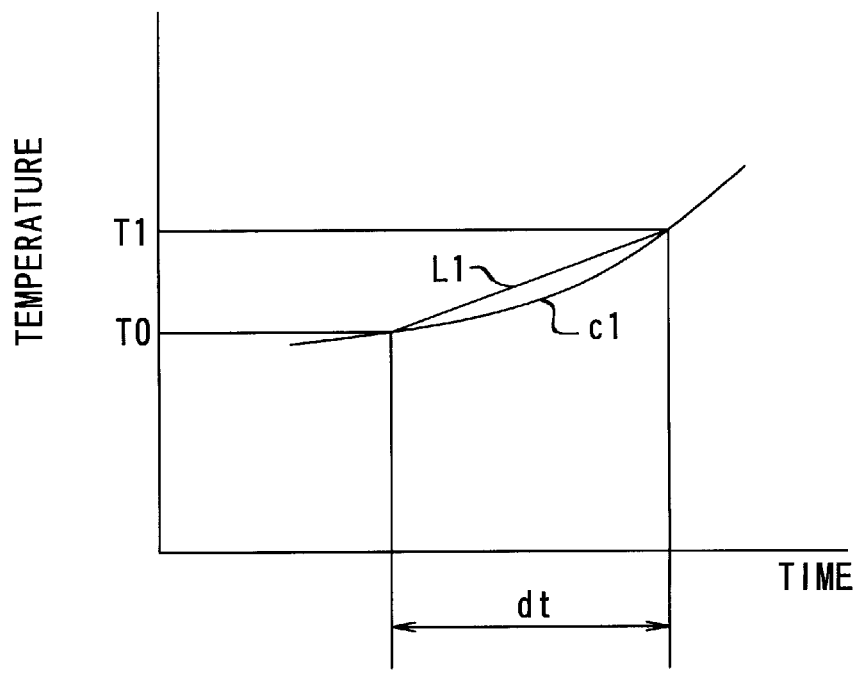
FIG. 9 is a graph showing a temperature gradient.

FIG. 9 is a graph showing a variation in temperature of the battery 194. It is here assumed that the temperature of the battery 194 rises from the initial temperature T0 to the temperature T1 in the preset time period dt as given by the curve c1 in FIG. 9. Under such conditions, the slope of the straight line L1 shown in FIG. 9 corresponds to the temperature gradient dT/dt of the battery 194.

The CPU 190a then reads a correction amount α of the temperature gradient at step S300. The correction amount of the temperature gradient is read from a table, which has been stored in advance in the ROM 190b. FIG. 10 shows an example of the table. As shown in the table of FIG. 10, the correction amount of the temperature gradient depends upon the mean discharge current (unit: ampere) and the temperature (unit: Celsius degree) of the battery 194. The correction amount eliminates the effect of a temperature rise due to the discharge of the battery 194 from the temperature gradient calculated at step S250. The settings of the correction amount will be discussed later.

The table used in this embodiment includes correction amounts corresponding to discrete values in the electric current range from 0 ampere to 100 ampere and in the temperature range from −30 degree Celsius to 60 degree Celsius. The procedure of step S300 reads a correction amount corresponding to the initial temperature T0 of the battery 194 measured at step S100 and the mean discharge current determined at step S150 from the table shown in FIG. 10. In the case where either the calculated mean discharge current or the observed temperature does not coincide with any one of the discrete values included in the table, for example, when the mean discharge current is equal to 2.5 ampere, the procedure of step S300 carries out interpolation of the table shown in FIG. 10 to calculate the correction amount of the temperature gradient. Another available technique sets the discrete values at sufficiently fine intervals and determines the correction amount not by the interpolation but by the method of raising to a unit or by the omission. By way of example, when the; mean discharge current is equal to 4.5 ampere, the value corresponding to the electric current of 5 ampere may be read from the table of FIG. 10.

Figure 13:
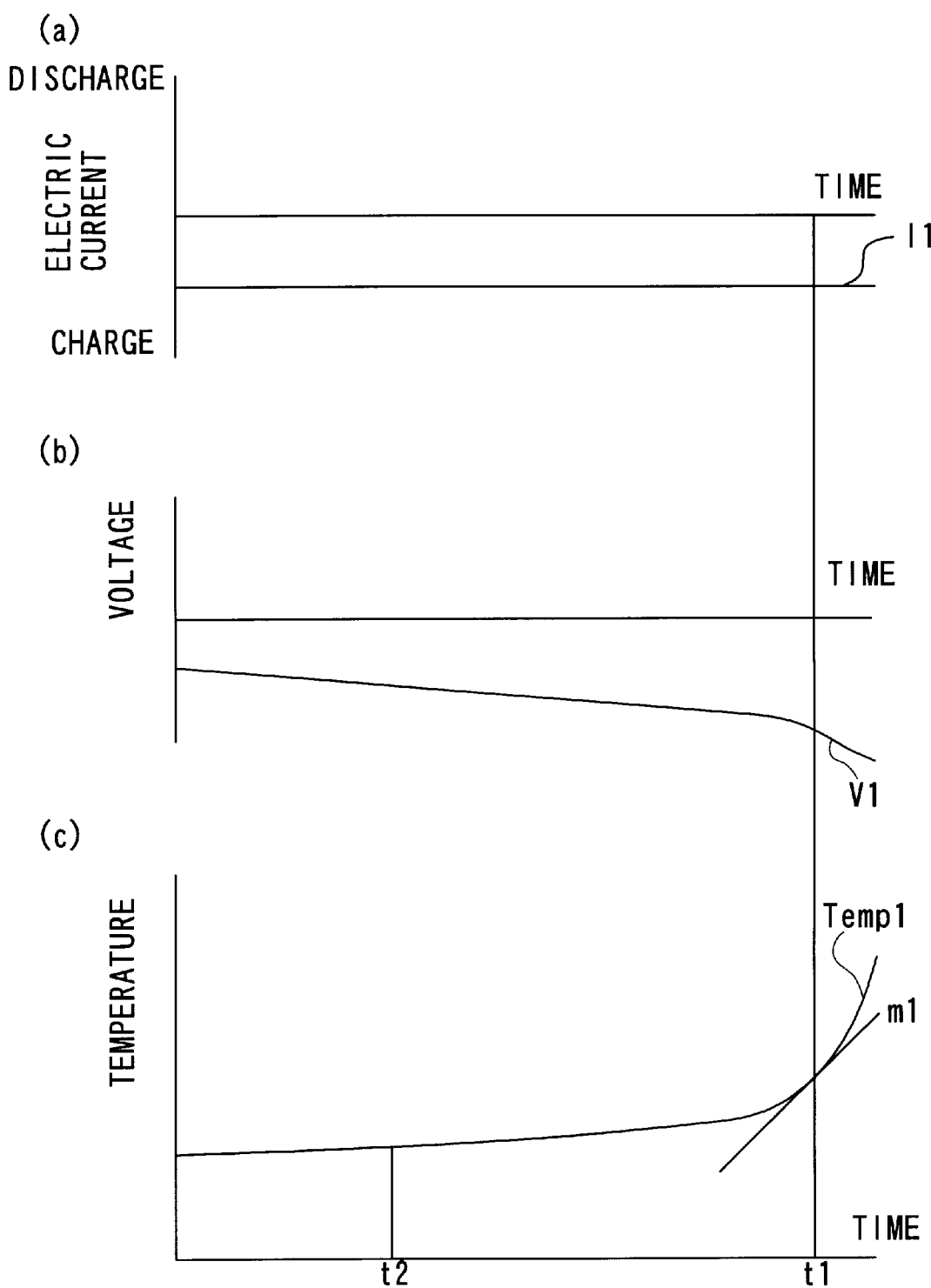
FIGS. 13(a)–13(c) graphs showing variations in electric current, voltage, and temperature when no discharge occurs in the course of charging.
Figure 14:
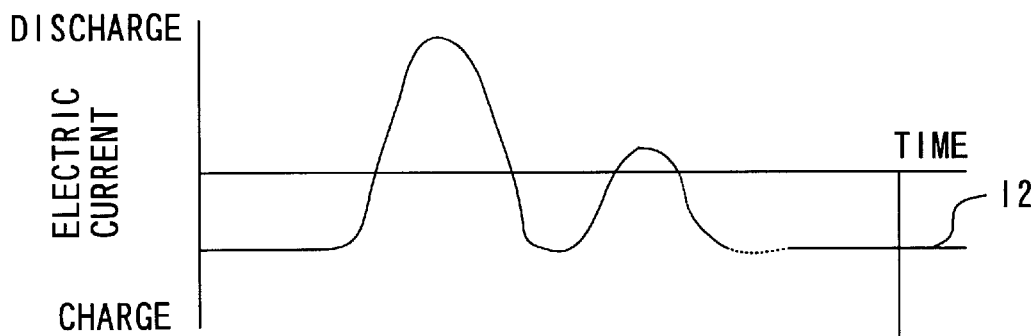
FIGS. 14(a)–14(c) graphs showing variations in electric current, voltage, and temperature when a discharge occurs in the course of charging.
Figure 14:
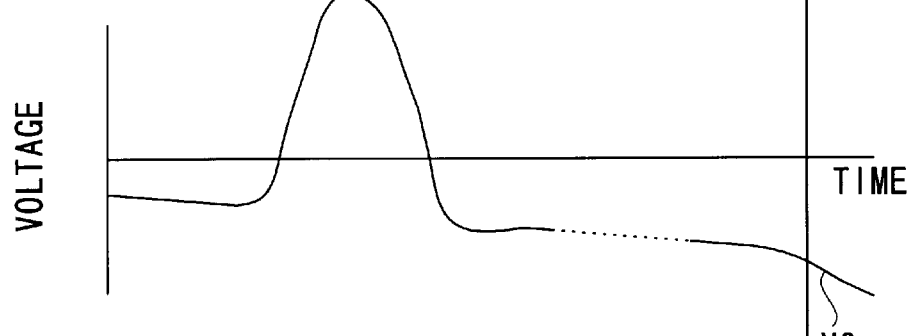
Figure 14:
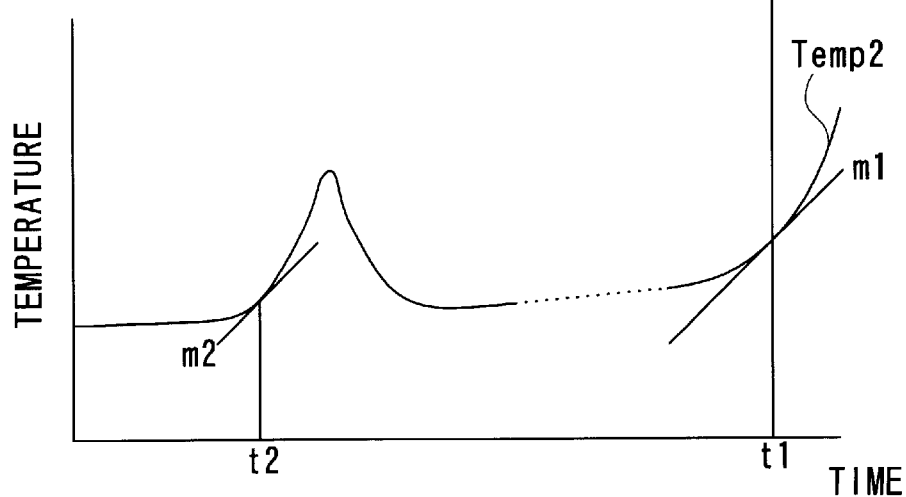

After reading the correction amount α, the CPU 190a corrects the temperature gradient with the correction amount α at step S350. The correction of the temperature gradient is carried out by subtracting the correction amount α read at step S300 from the temperature gradient dT/dt calculated at step S250. The temperature gradient dT/dt corrected in this manner is compared with a preset temperature gradient Thr1 at step S400. The preset temperature gradient Thr1 arises when the charged state of the battery 194 is close to the full charge level. The battery 194 has a temperature variation shown in FIG. 13(*c*) in the course of charging. The temperature abruptly increases when the charged state of the battery 194 is close to the full charge level. Namely the temperature gradient abruptly increases as given by the slope of the straight line m1 in FIG. 13. The preset temperature gradient Thr1 used for the comparison at step S400 corresponds to the slope of the straight line m1 shown in FIG. 13. The preset temperature gradient Thr1 may be determined experimentally by taking into account the type of the battery 194, the chargeable capacity, and the margin to the full charge level.

The procedure of step S350 corrects the temperature gradient dT/dt to a value relating to only the charging process. In the case where the corrected temperature gradient dT/dt is greater than the preset temperature gradient Thr1 at step S400, the CPU 190*a* determines that the charged state of the battery 194 is close to the full charge level and carries out a charging stop process at step S450. In the battery charging control routine of this embodiment, the charging stop process sets on a flag representing the full charge level.

When the flag is ON, the control is carried out according to another routine to drive the engine 150 in the state without causing the battery 194 to be charged. The control unit 190 executes this control procedure as well as the battery charging control. The concrete procedure of the control sets the driving state and controls the operation of the engine 150 while setting the charge-discharge electric power Pb equal to or lower than the value '0' in the torque control routine discussed above with the flowchart of FIG. 4. The operation of the engine 150 with the charge-discharge electric power Pb equal to zero enables the charged state of the battery 194 to be kept close to the full charge level. The operation of the engine 150 with the negative charge-discharge electric power Pb causes the charged state of the battery 194 to be shifted to the state having the margin to the full charge level.

The following describes the settings of the table shown in FIG. 10. The table is experimentally set since the correction amount of the temperature gradient is varied according to the type of the battery 194 and the chargeable capacity. As discussed previously, the table of FIG. 10 stores the temperature gradient arising due to the discharge of the battery 194 corresponding to the mean discharge current and the initial temperature of the battery 194. In the actual driving state, the discharging state of the battery 194 varies momently. The table of FIG. 10 is, however, obtained by assuming the discharge state with a fixed amount of electric current and calculating the temperature gradient based on the temperatures before and after the discharge. The calculation of the temperature gradient has been described previously with the graph of FIG. 9.

The measurement is carried out with respect to a variety of discharge currents and initial temperatures of the battery 194 to give the table of FIG. 10. It is required to make the time interval for calculating the temperature gradient coincident with the time interval dt, at which the battery charging control routine discussed previously with the flowchart of FIG. 6 is carried out. In this embodiment, the table is prepared with the discharge current and the initial temperature, which most significantly affect the temperature gradient, as the parameters. A greater number of parameters may, however, be used to prepare a similar table. If some degree of error in correction amount is allowable in the table, the table may be prepared only with either one of these parameters.

The table of FIG. 10 gives the correction amounts that prevent the temperature gradient of the battery 194 from exceeding the preset temperature gradient Thr1 due to the heat in the course of discharging. A variety of values that satisfy this condition may be set to the correction amounts in the table of FIG. 10. For example, greater values than the possible temperature rises due to the discharge may be stored in the table. The correction amounts stored in the table may be products of the temperature gradients due to the heat in the course of discharging and a preset positive proportional coefficient. The correction amounts may alternatively be fixed to a predetermined value. For example, the predetermined value may be equal to or greater than the maximum temperature gradient that is ascribed to the discharging process.

The charging control apparatus, which carries out the battery charging control discussed above, corrects the observed temperature gradient of the battery 194 and thereby determines the temperature gradient relating to only the charging process. In the hybrid vehicle with the battery 194 that is subjected to repeated charge and discharge, this arrangement of the embodiment effectively prevents the battery 194 from being excessively charged even when the remaining charge meter 199 malfunctions or when there is an extreme error in detection of the charged state by the integration of the electric current. When the charged state of the battery 194 is determined to be close to the full charge level, a shift of the driving point of the engine 150 enables the required power to be output without charging the battery 194. This structure accordingly ensures a smooth run of the hybrid vehicle.

(4) Battery Charging Control of Second Embodiment

The following describes a hybrid vehicle with a charging control apparatus and a power output apparatus mounted thereon as a second embodiment according to the present invention. The hybrid vehicle of the second embodiment has the same hardware structure as that of the first embodiment shown in FIGS. 1 through 3. The second embodiment accordingly follows the same general operation principle as the first embodiment and carries out the torque control routine discussed above with the flowchart of FIG. 4. The only difference from the first embodiment is the battery charging control routine discussed below.

Figure 11:
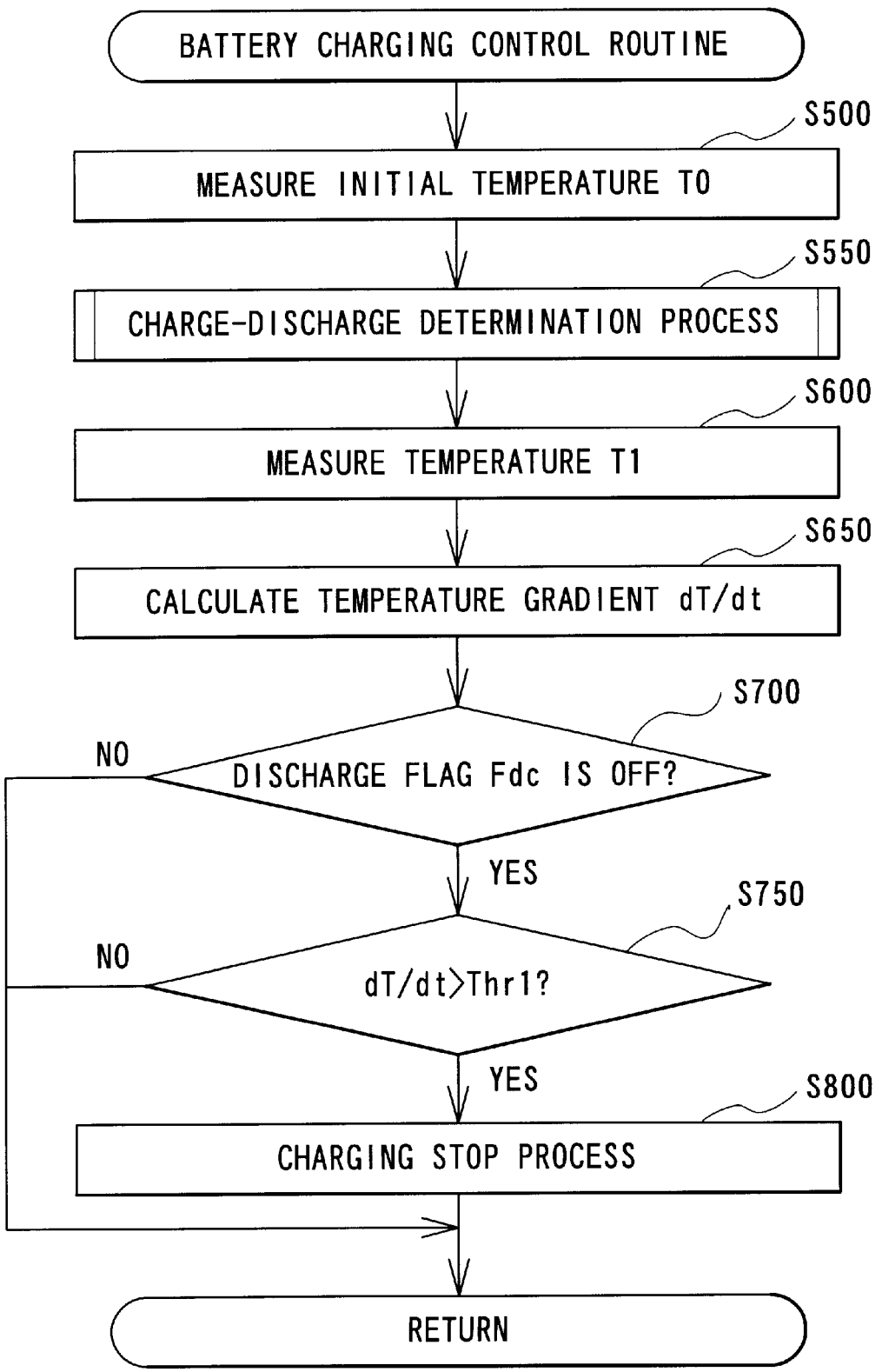
FIG. 11 is a flowchart showing another battery charging control routine carried out in a second embodiment according to the present invention.

FIG. 11 is a flowchart showing a battery charging control routine carried out in the second embodiment. This routine is periodically executed by the CPU 190*a*. When the program enters the battery charging control routine of FIG. 11, the CPU 190*a* first measures an initial temperature T0 of the battery 194 at step S500. The temperature of the battery 194 is measured with the battery temperature sensor 196 shown in FIG. 1.

Figure 12:
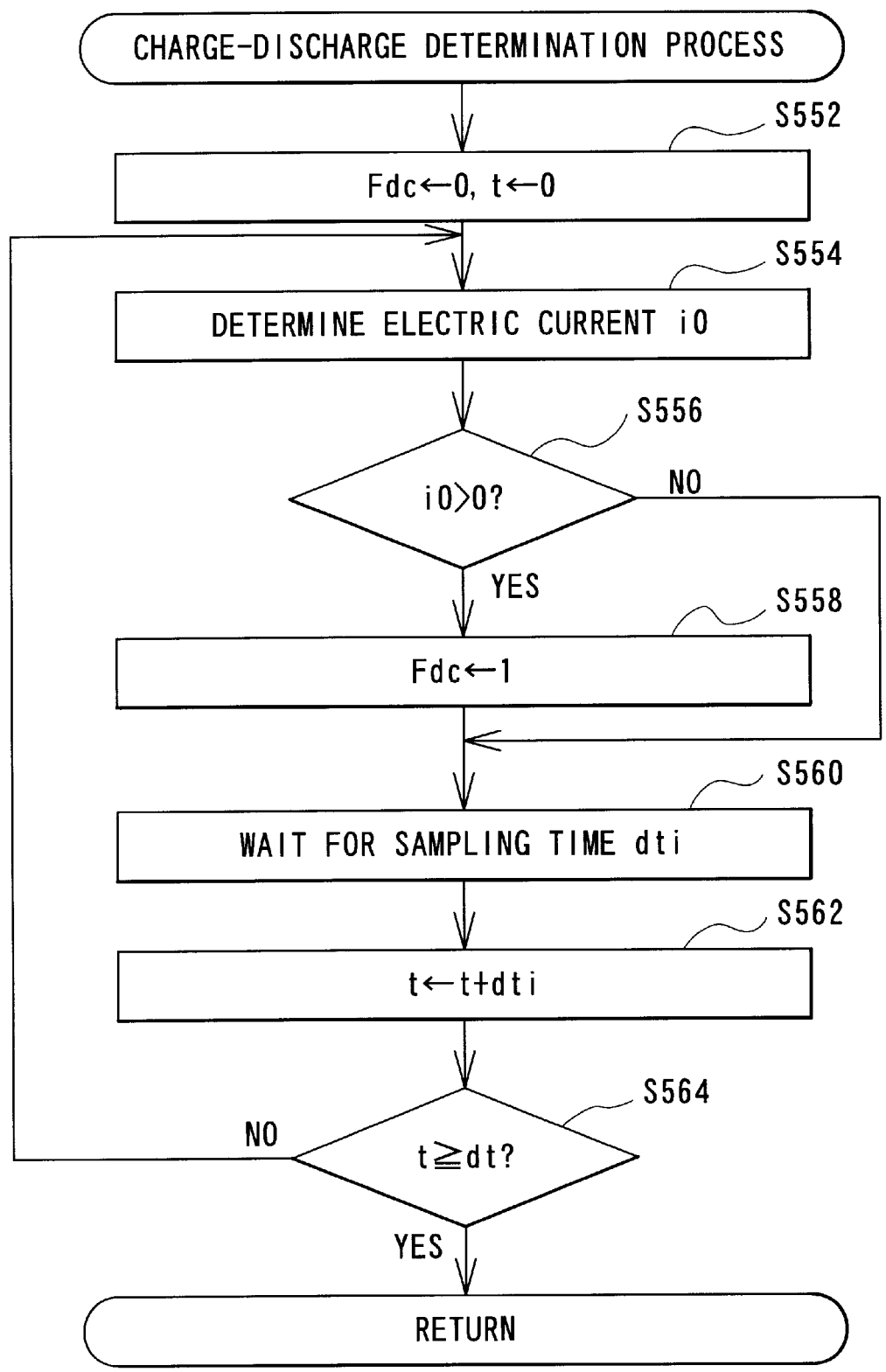
FIG. 12 is a flowchart showing the details of the charge-discharge determination process executed at step S550 in the flowchart of FIG. 11.

The CPU 190*a* then carries out a charge-discharge determination process at step S550. The flowchart of FIG. 12 shows the details of this charge-discharge determination process. When the program enters the charge-discharge determination process, the CPU 190*a* carries out initialization at step S552. The concrete procedure of initialization substitutes the value '0' into a discharge flag Fdc, which represents the discharging state, to set the discharge flag Fdc off, and substitutes the value '0' into a variable t, which represents the elapse of time.

The program then determines an electric current i0 at step S554. The electric current i0 is obtained by summing up the measurements of the current sensors 102*u*, 102*v*, and 102*w* (see FIG. 2) provided for the motor MG1 and the corresponding current sensors provided for the motor MG2. The CPU 190*a* checks the sign of the electric current i0 thus obtained at step S556. The positive sign of the electric current i0 implies that the battery 194 is being discharged.

The CPU 190a accordingly substitutes the value '1' into the discharge flag Fdc to set the discharge flag Fdc on at step S558. No such processing is carried out in the case where the electric current i0 has the negative sign.

The CPU 190a repeatedly carries out the above processing at every sampling time dti until the elapse of time t exceeds a preset time period dt (steps S560 through S564). The method sets the discharge flag Fdc on if the discharge of the battery 194 occurs even once within the preset time period dt.

Referring back to the flowchart of FIG. 11, after the charge-discharge determination process is concluded at step S550, the CPU 190a measures a temperature T1 of the battery 194 at step S600 and calculates the temperature gradient dT/dt at step S650. The calculation of the temperature gradient dT/dt follows the method discussed in the first embodiment with the graph of FIG. 9.

The CPU 190a subsequently determines whether or not the discharge flag Fdc is off at step S700. When it is determined that the discharge flag Fdc is off or equal to zero, this means that the battery 194 is being charged. In this case, the observed temperature gradient dT/dt is compared with a preset temperature gradient Thr1 at step S750. In the case where the observed temperature gradient dT/dt is greater than the preset temperature gradient Thr1, the program carries out the charging stop process at step S800. The settings of the preset temperature gradient Thr1 and the details of the charging stop process are the same as those discussed in the first embodiment. In the case where the observed temperature gradient dT/dt is less than the preset temperature gradient Thr1, on the other hand, the program determines that there is no fear that the battery 194 is excessively charged. The battery 194 accordingly continues to be charged.

When it is determined at step S700 that the discharge flag Fdc is on, on the other hand, this means that the battery 194 is being discharged. In this case, there is no fear that the battery 194 is excessively charged. The program accordingly skips the comparison of the temperature gradient at step S750 as well as the charging stop process at step S800. As discussed previously with the flowchart of FIG. 12, the charge-discharge determination process of this embodiment sets the discharge flag Fdc on if the discharge of the battery 194 occurs even once within the preset time period dt. There is, of course, a possibility that the battery 194 is excessively charged after the discharge. The arrangement of the second embodiment makes the preset time period dt sufficiently short to avoid this possibility.

In the hybrid vehicle that carries out the battery charging control of the second embodiment, the determination of the full charge state based on the temperature gradient is carried out only when the battery 194 is being charged. The determination is accordingly free from the effect of heat due to the discharge of the battery 194. This arrangement of the second embodiment ensures the adequate charge and discharge of the battery 194 and thereby effectively prevents the battery 194 from being charged excessively. The structure of the second embodiment does not require the table of FIG. 10, which is used in the structure of the first embodiment. The second embodiment thus realizes the effective battery charging control by the simpler structure.

The first and the second embodiments discussed above regard the hybrid vehicle with the planetary gear 120. The principle of the present invention is, however, not restricted to the structure of the embodiments but may be applicable to hybrid vehicles of other structures, such as the series-hybrid vehicle. The present invention is not restricted to the hybrid vehicle, but is also applicable to the charging control of the battery mounted on the conventional vehicle that is driven only with the power from the engine as the driving source. The present invention is further applicable to a variety of apparatuses with the battery incorporated therein, as well as to the power output apparatus for the vehicle.

The hybrid vehicles of the above embodiments have the nickel-hydrogen battery mounted thereon. The principle of the present invention is naturally applicable to a variety of other batteries, for example, lead acid batteries, nickel-cadmium batteries, and lithium batteries.

The present invention is not restricted to the above embodiments or their modifications, but there may be many other modifications, changes, and alterations without departing from the scope or spirit of the main characteristics of the present invention.

It should be clearly understood that the above embodiments are only illustrative and not restrictive in any sense. The scope and spirit of the present invention are limited only by the terms of the appended claims.

What is claimed is:

1. A charging control apparatus that controls a charging process in a secondary battery, which is subjected to repeated charge and discharge in a specific charged state that is lower than a full charge level, in order to prevent said secondary battery from being charged excessively, said charging control apparatus comprising:

a temperature gradient determination unit that determines a temperature gradient, which represents a temperature rise per unit time, due to the charging process in said secondary battery as a charging-time temperature gradient, including a measurement unit that measures a temperature gradient of said secondary battery, irrespective of whether the temperature rise is ascribed to the charging process or a discharging process, a correction amount determination unit that determines a correction amount of the observed temperature gradient of said second battery, based on a temperature gradient due to the discharging process, and a computation unit that calculates the charging-time temperature gradient from the observed temperature gradient measured by said measurement unit and the correction amount determined by said correction amount determination unit; and a charging stop unit that stops the charging process in said secondary battery when the charging-time temperature gradient is greater than a specific temperature gradient, which is preset according to a charged state of said secondary battery.

2. A charging control apparatus in accordance with claim 1, wherein said correction amount determination unit comprises:

a memory unit that stores a relationship among discharge current of said secondary battery, temperature of said secondary battery, and the correction amount;

a discharge current measurement unit that measures the discharge current of said secondary battery; and a temperature measurement unit that measures the temperature of said secondary battery, and wherein said correction amount determination unit refers to the relationship stored in said memory unit and reads the correction amount corresponding to the observed discharge current and the observed temperature from the relationship.

3. A charging control apparatus that controls a charging process in a secondary battery, which is subjected to repeated charge and discharge in a specific charged state that is lower than a full charge level, in order to prevent said secondary battery from being charged excessively, said charging control apparatus comprising:

a temperature gradient determination unit that determines a temperature gradient, which represents a temperature rise per unit time, due to the charging process in said secondary battery as a charging-time temperature gradient, including a charge determination unit that determines whether said secondary battery is being charged and a measurement unit that measures a temperature gradient of said secondary battery when it is determined that said secondary battery is being charged; and a charging stop unit that stops the charging process in said secondary battery when the charging-time temperature gradient is greater than a specific temperature gradient, which is preset according to a charged state of said secondary battery.

4. A hybrid-type power output apparatus having at least an engine, a motor, and a secondary battery, said power output apparatus comprising:

a charging-time operation control unit that controls driving conditions of said engine and said motor in such a manner that enables said secondary battery to be charged with at least part of an electric power generated by said motor;

a temperature gradient determination unit that determines a temperature gradient, which represents a temperature rise per unit time, due to a charging process in said secondary battery as a charging-time temperature gradient; and a charging stop control unit that drives said engine and said motor under specific driving conditions without charging said secondary battery when the charging-time temperature gradient is greater than a specific temperature gradient, which is preset according to a charged state of said secondary battery.

5. A power output apparatus in accordance with claim 4, wherein said temperature gradient determination unit comprises:

a measurement unit that measures a temperature gradient of said secondary battery, irrespective of whether the temperature rise is ascribed to the charging process or a discharging process;

a correction amount determination unit that determines a correction amount of the observed temperature gradient of said secondary battery, based on a temperature gradient due to the discharging process; and a computation unit that calculates the charging-time temperature gradient from the observed temperature gradient measured by said measurement unit and the correction amount determined by said correction amount determination unit.

6. A power output apparatus in accordance with claim 4, wherein said temperature gradient determination unit comprises:

a charge determination unit that determines whether said secondary battery is being charged; and a measurement unit that measures a temperature gradient of said secondary battery when it is determined that said secondary battery is being charged.

7. A method of controlling a charging process in a secondary battery, which is subjected to repeated charge and discharge in a specific charged state that is lower than a full charge level, in order to prevent said secondary battery from being charged excessively, said method comprising:

determining a temperature gradient, which represents a temperature rise per unit time, due to the charging process in said secondary battery as a charging-time temperature gradient, including measuring a temperature gradient of said secondary battery, irrespective of whether the temperature rise is ascribed to the charging process or a discharging process, determining a correction amount of the observed temperature gradient of said secondary battery, based on a temperature gradient due to the discharging process, and calculating the charging-time temperature gradient from the measured temperature gradient and the determined correction amount; and stopping the charging process in said secondary battery when the charging-time temperature gradient is greater than a specific temperature gradient, which is preset according to a charged state of said secondary battery.

8. A method of controlling a charging process in a secondary battery, which is subjected to repeated charge and discharge in a specific charged state that is lower than a full charge level, in order to prevent said secondary battery from being charged excessively, the method comprising:

determining a temperature gradient, which represents a temperature rise per unit time, due to the charging process in said secondary battery as a charging-time temperature gradient, including determining whether said secondary battery is being charged or being discharged and measuring a temperature gradient of said secondary battery when it is determined that said secondary battery is being charged; and stopping the charging process in said secondary battery when the charging-time temperature gradient is greater than a specific temperature gradient, which is preset according to a charged state of said secondary battery.

9. A computer program product in which a computer program is recorded, said computer program being used to detect an abnormality of a secondary battery, which is subjected to repeated charge and discharge in a specific charged state that is lower than a full charge level, said computer program causing a computer to realize the functions of:

determining a temperature gradient, which represents a temperature rise per unit time, due to the charging process in said secondary battery as a charging-time temperature gradient; and outputting a signal that informs an operator of an abnormality of said secondary battery when the charging-time temperature gradient is greater than a specific temperature gradient, which is preset according to a charged state of said secondary battery.

* * * * *